United States Patent
Manor et al.

(10) Patent No.: US 10,826,962 B2
(45) Date of Patent: Nov. 3, 2020

(54) TECHNIQUES FOR DYNAMIC SHARED COMPRESSION

(71) Applicant: Equalum Ltd., Tel Aviv (IL)

(72) Inventors: Ofir Manor, Tel-Aviv (IL); Nir Livneh, Petach Tikva (IL)

(73) Assignee: Equalum Ltd., Tel-Aviv (IL)

( * ) Notice: Subject to any disclaimer, the term of this patent is extended or adjusted under 35 U.S.C. 154(b) by 914 days.

(21) Appl. No.: 14/975,899

(22) Filed: Dec. 21, 2015

(65) Prior Publication Data

US 2017/0019449 A1    Jan. 19, 2017

Related U.S. Application Data

(60) Provisional application No. 62/191,637, filed on Jul. 13, 2015.

(51) Int. Cl.
*G06F 15/16* (2006.01)
*H04L 29/06* (2006.01)

(52) U.S. Cl.
CPC .................. *H04L 65/607* (2013.01)

(58) Field of Classification Search
CPC ....... H04L 65/607; H04L 69/04; H04L 69/22; H04N 21/2662; H04N 21/4621; H04N 21/64792; H04N 21/238; H04N 21/438
USPC ......................................................... 709/247
See application file for complete search history.

(56) References Cited

U.S. PATENT DOCUMENTS

| | | | | |
|---|---|---|---|---|
| 7,743,165 B2* | 6/2010 | Paparella | .............. | H04L 67/327 709/236 |
| 8,509,315 B1* | 8/2013 | Petranovich | ....... | H04N 21/4348 375/240.28 |
| 8,804,814 B1* | 8/2014 | Paris | .................... | H04N 19/423 375/240 |
| 2012/0257117 A1* | 10/2012 | Freundlich | ......... | H04N 21/2381 348/723 |
| 2012/0262314 A1* | 10/2012 | Carlson | ................. | H03M 7/425 341/87 |
| 2015/0370827 A1* | 12/2015 | Parkison | ........... | G06F 17/30215 707/626 |

* cited by examiner

*Primary Examiner* — Umar Cheema
*Assistant Examiner* — Anh Nguyen
(74) *Attorney, Agent, or Firm* — M&B IP Analysts, LLC

(57) ABSTRACT

To realize some of the advantages discussed above, there is provided a computerized method for dynamic shared compression between a first node and at least a second node communicatively connected over a network. The method comprises receiving by the first node a first plurality of data inputs from the at least a second node. At least a pattern corresponding to the received first plurality of data inputs is continuously determined. Compression metadata corresponding to the at least a pattern are periodically generated. The compression metadata is stored in a memory. The compression metadata is provided to the at least a second node.

16 Claims, 2 Drawing Sheets

TECHNIQUES FOR DYNAMIC SHARED COMPRESSION

BACKGROUND

Field

The disclosure teaches techniques related to data stream compression and particularly to dynamic data stream compression.

Related Art

Advances in technology result in an abundance of data generated, such as measurements, performance indicators, sensor readings, analytics, etc. While there may be many uses for data gathered and generated around a process, the abundance of data points make it difficult to obtain meaningful insights, specifically in real-time, or approximate thereto. For example, highly active websites may generate data events at a high rate. While each event may be small and represented by tens to several thousand of bytes, the sheer volume of events may be tens or hundreds of thousand event per second. Typically, the data is generated by many nodes connected through a network to a main node. In order to process the data, the main node must first access the data. However, sending data of this volume requires substantial bandwidth, especially when the data is required to be transmitted in real-time. It would therefore be advantageous to provide techniques capable of transmitting and receiving a stream of data points while conserving bandwidth.

The approaches described in this section are approaches that could be pursued, but not necessarily approaches that have been previously conceived or pursued. Therefore, unless otherwise indicated, any of the approaches described in this section are not necessarily prior art techniques merely based on their inclusion in this section. Similarly, issues identified with respect to one or more approaches are not necessarily recognized in any prior art, unless otherwise indicated.

SUMMARY

To realize some of the advantages discussed above, there is provided a computerized method for dynamic shared compression between a first node and at least a second node communicatively connected over a network. The method comprises receiving by the first node a first plurality of data inputs from the at least a second node. At least a pattern corresponding to the received first plurality of data inputs is continuously determined. Compression metadata corresponding to the at least a pattern are periodically generated. The compression metadata is stored in a memory. The compression metadata is provided to the at least a second node.

Another aspect of the disclosed teachings is a computerized method for dynamic shared compression. The method comprises receiving a first plurality of data inputs. At least a pattern corresponding to the received first plurality of data inputs is continuously determined. Compression metadata further corresponding to the at least a pattern, such that the compression metadata is smaller than the determined at least a pattern is periodically generated using the compression metadata for compression and decompression of data.

Still another aspect of the disclosed teachings is a computer node for performing dynamic shared data compression comprising a processing unit and a memory communicatively connected to the processing unit. The memory comprises instructions to enable the processing unit to continuously determine at least a pattern from received input data and generate metadata from the determined at least a pattern, wherein the metadata is smaller than the generated at least a pattern, wherein the compression metadata comprises a data set smaller than a data set of the determined pattern

BRIEF DESCRIPTION OF THE DRAWINGS

The foregoing and other objects, features and advantages will become apparent and more readily appreciated from the following detailed description of the disclosed teachings taken in conjunction with the accompanying drawings, in which.

DETAILED DESCRIPTION

Figure 1:
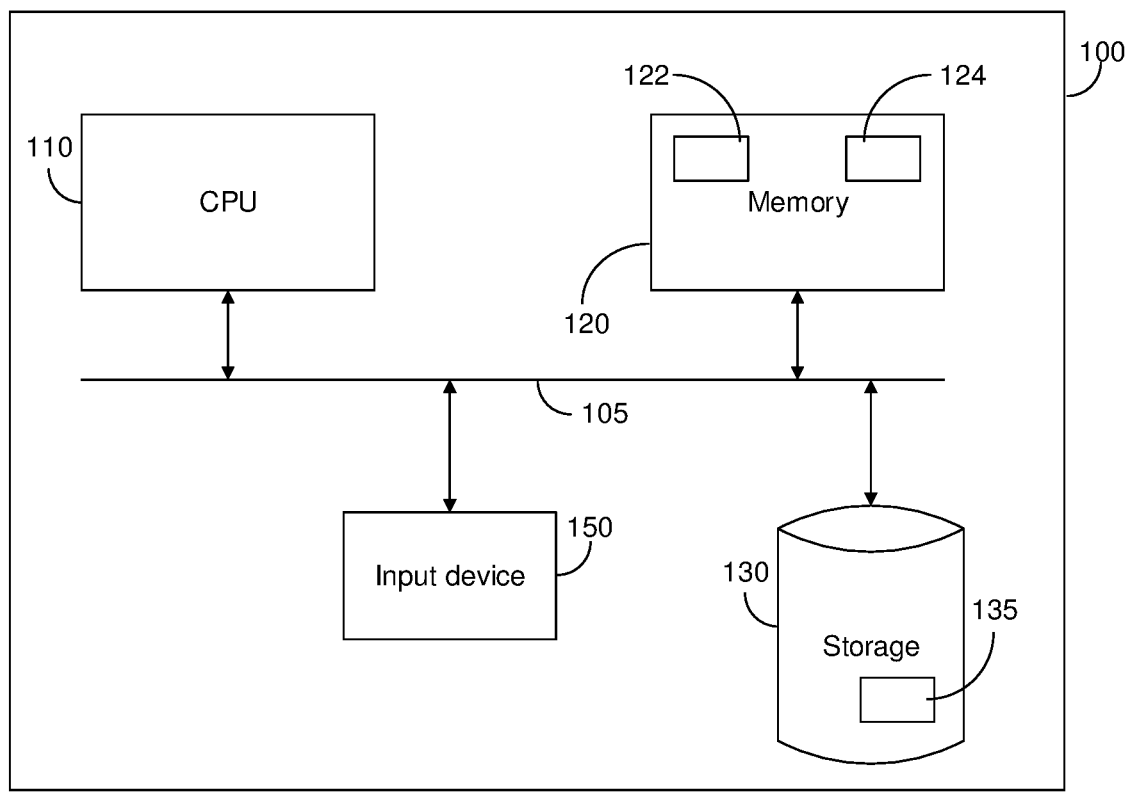
FIG. 1 is an exemplary and non-limiting schematic illustration of system implemented according to an exemplary embodiment.

Exemplary embodiments will be described in detail herein with reference to accompanying drawings so as to be easily realized by a person having ordinary skill in the art. The exemplary embodiments should not be treated as limiting and it should be clear that several alternate embodiments and other alternate implementations are possible. Descriptions of well-known parts and steps are omitted for clarity, and like reference numerals refer to like elements throughout.

It is important to note that the embodiments disclosed herein are only examples of the many advantageous uses of the innovative teachings disclosed herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

The disclosed teachings include a method for dynamic shared compression between a first node and a second node communicatively connected over a network. The disclosed teachings provide for conservation of bandwidth over the network. A first plurality of data inputs is received by the first node from the second node. A pattern corresponding to the received first plurality of data inputs is continuously determined. Compression metadata that further corresponds to the determined pattern is periodically generated, such that the compression metadata includes a data set smaller than a data set of the determined pattern. The compression metadata is stored in a storage and is provided to the second node. Compression of a second plurality of data input is performed at the second node using the compression metadata. Upon receiving this compressed data from the second node, decompression is performed at the first node using the stored compression metadata.

FIG. 1 is an exemplary and non-limiting schematic illustration of first node 100 that uses dynamic shared compression between the first node 100 and at least a second node 220-1 (shown in FIG. 2) communicatively connected over a network 210 (shown in FIG. 2) implemented according to an exemplary embodiment. The system 100 comprises at least one processing element 110. This processing element 110 could be, for example, a central processing unit (CPU). In an alternate embodiment, the processing unit 110 may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The CPU 110 is coupled via a bus 105 to a memory 120. The memory 120 further comprises a memory portion 122 that contains instructions that when executed by the processing element 110 performs the method described in more detail herein. The memory may be further used as a working scratch pad for the processing element 110, a temporary storage, and others, as the case may be. The memory may comprise of volatile memory such as, but not limited to random access memory (RAM), or non-volatile memory (NVM), such as, but not limited to, Flash memory. Memory 120 may further comprise memory portion 124 containing a plurality of data inputs. The processing element 110 may be coupled to an input device 150. The processing element 110 may be further coupled with a database 130. Database 130 may be used for the purpose of storing a copy of instructions implementing the method executed in accordance with the disclosed technique. Database 130 may further comprise storage portion 135 containing compression metadata. The processing unit 110 and/or the memory 120 may also include machine-readable media for storing software.

Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein. In some embodiments, the first node may be include a cluster having one or more servers configured as a single engine.

Figure 2:
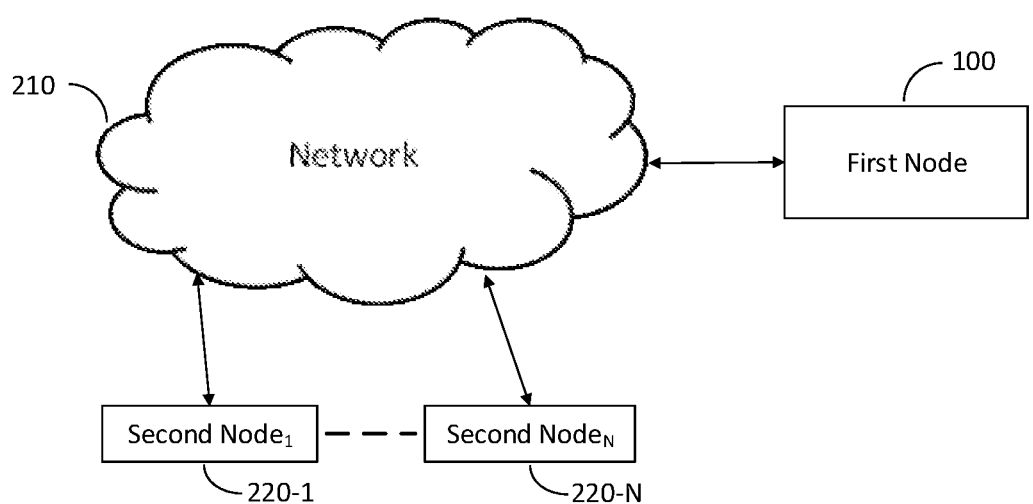
FIG. 2 is a schematic illustration of a network including a first node and a plurality of second nodes using dynamic shared compression in accordance with an exemplary embodiment.

FIG. 2 is a non-limiting exemplary schematic illustration of a network including a first node and a plurality of second nodes using dynamic shared compression according to the disclosed techniques. Network 210 is configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity. The network 210 is communicatively connected to a first node 100.

The first node 100 is configured to receive a plurality of data inputs from one or more second nodes. The network 210 is further communicatively connected to one or more second nodes 220, for example second nodes 220-1 through 220-N. A second node 220 is configured to send a plurality of data inputs to the first node 100. In this example, 'N' is a natural integer having a value of '1' or more.

Figure 3:
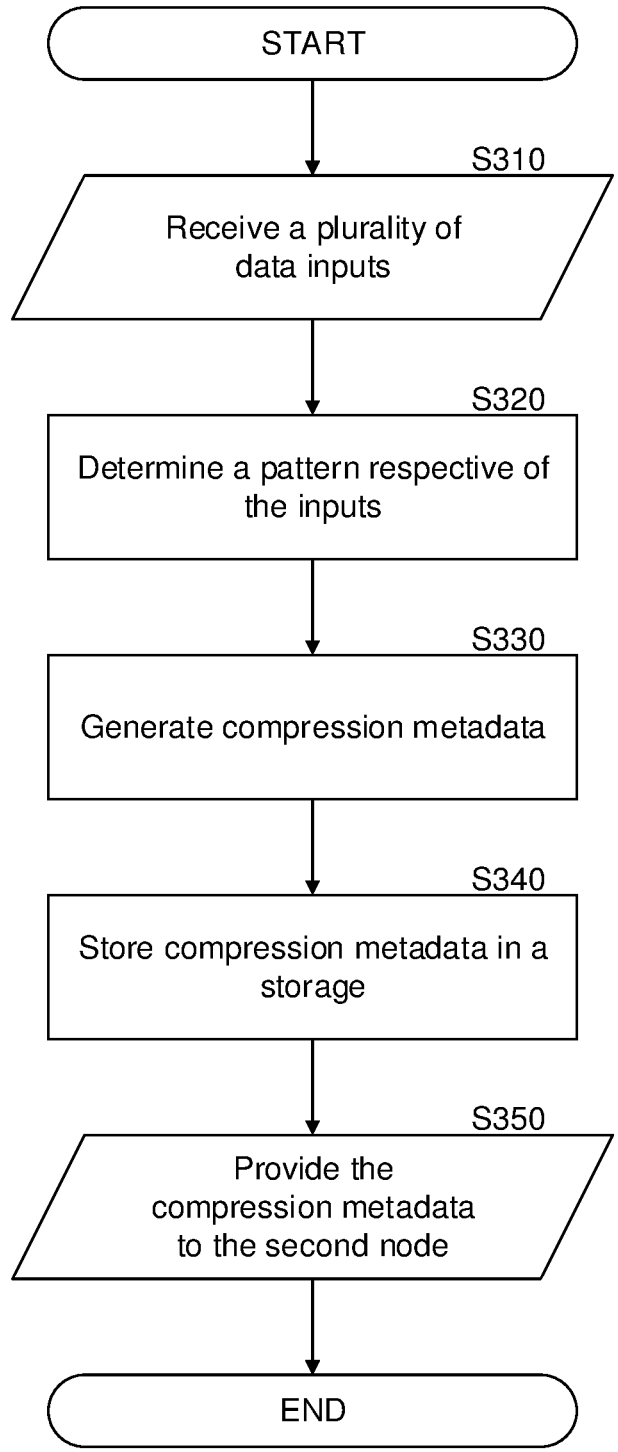
FIG. 3 is a flowchart of a computerized method for dynamic shared compression between a first node and a second node communicatively connected over a network in accordance with an embodiment.

FIG. 3 is a non-limiting exemplary flowchart of a computerized method for dynamic shared compression between a first node and a second node communicatively connected over a network in accordance with the disclosed teachings. In S310 a first plurality of data inputs is received by a first node, such as first node 100 from a second node, such as any of the second nodes 220-1 through 220-N. The second node may be a machine, for example a server. The second node may include an agent program which configures the second node to send data inputs from the second node to the first node. In S320 at least a pattern corresponding to the received first plurality of data inputs is determined. Determining patterns corresponding to the received first plurality of data inputs may be continuously performed. Determining patterns may be performed by various methods of pattern recognition. In S330 compression metadata further corresponding to the at least a determined pattern is periodically generated, such that the compression metadata includes a data set smaller than a data set of the determined pattern.

Compression metadata may include, for example, a map of symbols in one embodiment, or in another embodiment—delta encoding. In S340 the compression metadata is stored in a storage, such as database 130. The compression metadata may be stored on a storage communicatively connected to the first node. In S350 the compression metadata is provided to the second node.

A second plurality of data inputs may be received by the first node from the second node. The second plurality of data inputs may be compressed using the compression metadata. Decompression of the second plurality of data inputs is performed at the first node using the stored compression metadata. In some embodiments, the compression metadata further includes a version number. In such embodiments the received second plurality of data inputs further includes a first compression metadata version number, and the stored compression metadata further includes a second version number. Decompressing is performed upon determination that the first compression metadata version number and the second version number are identical. For example, the first node may store a symbol map with a first version, and the second node may store a symbol map with a second version. If the versions are not identical, decompression of the data may not always be performed. In some embodiments, if the version number is not identical, a node may initiate a synchronization between conflicting versions. In certain exemplary embodiments, synchronization may involve sending only the difference between the first symbol map and the second symbol map from the first node to the second node. In some embodiments, a plurality of second nodes each send the first node a first plurality of data points. In such embodiments, the first node may provide a unique compression metadata to each of a plurality of second nodes, or to a portion of the plurality of second nodes. For example, a unique symbol map may be generated for each of the second nodes, or for each of a group including a portion of the plurality of second nodes. In other such embodiments, the first node may provide a shared compression metadata to each of the plurality of second nodes. In the example of a symbol map, each of the second nodes are provided with the same symbol map.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for dynamic shared compression between a first node and at least a second node communicatively connected over a network, the method comprising:
   receiving by the first node a first plurality of data inputs from the at least a second node;
   continuously determining at least a pattern corresponding to the received first plurality of data inputs;
   periodically generating compression metadata corresponding to the at least a pattern;
   storing the compression metadata in a memory; and
   providing the compression metadata to the at least a second node for use by the second node to at least compress subsequent data to be transmitted to the first node;
   wherein the compression metadata comprises a data set smaller than a data set of the determined pattern.

2. The computerized method of claim 1, further comprising:
   receiving by the first node a second plurality of data inputs from the second node, the second plurality of data inputs having been compressed by the second node using the compression metadata; and
   decompressing at the first node the second plurality of data inputs using the stored compression metadata.

3. The computerized method of claim 2, wherein the compression metadata further comprises a version number.

4. The computerized method of claim 2, wherein the received second plurality of data inputs further comprise a first compression metadata version number, and the stored compression metadata further comprises a second version number.

5. The computerized method of claim 4, wherein decompressing is performed upon determination that the first compression metadata version number and the second version number are identical.

6. The computerized method of claim 1, wherein the first node provides unique compression metadata to each of a plurality of second nodes.

7. The computerized method of claim 1, wherein the first node provides shared compression metadata to each of a plurality of second nodes.

8. The computerized method of claim 1, wherein the compression metadata is any of: a symbol map, and delta encoding.

9. A computerized method for dynamic shared compression, the method comprising:
   receiving a first plurality of data inputs;
   continuously determining at least a pattern corresponding to the received first plurality of data inputs;
   periodically generating compression metadata further corresponding to the at least a pattern, such that the compression metadata is smaller than the determined at least a pattern;
   providing the compression metadata from a node in which it is generated to another node;
   using the compression metadata for compression of data transmitted from the node and decompression of data received from the other node.

10. The computerized method of claim 9, wherein the compression metadata further comprises a version number.

11. The computerized method of claim 9, wherein the compression metadata is shared with at least one more computer node.

12. The computerized method of claim 9, wherein the compression metadata is any of: a symbol map, and delta encoding.

13. A computer node for performing dynamic shared data compression comprising:
   a processing unit;
   a memory communicatively connected to the processing unit;
   the memory comprising instructions to enable the processing unit to:
   continuously determine at least a pattern from input data received from another computer node; and
   generate compression metadata from the determined at least a pattern, wherein the compression metadata is smaller than the generated at least a pattern;
   transmitting the compression metadata from the computer node to at least the other computer for use therein to at least compress subsequent data to be transmitted from the other computer node to the computer node.

14. The computer node of claim 13, wherein the compression metadata further comprises a version number.

15. The computer node of claim 13, wherein the compression metadata is shared with one or more computer nodes.

16. The computer node of claim 13, wherein the compression metadata is any of: a symbol map, and delta encoding.

* * * * *